United States Patent [19]

Downing

[11] Patent Number: 4,878,644

[45] Date of Patent: Nov. 7, 1989

[54] ROUTER BRACKET

[76] Inventor: Charles Downing, R.R. 1, Box 13, Sedan, Kans. 67361

[21] Appl. No.: 196,678

[22] Filed: May 20, 1988

[51] Int. Cl.⁴ ........................................... F16M 13/00
[52] U.S. Cl. ..................... 248/674; 248/229; 248/904
[58] Field of Search ............... 248/674, 572, 229, 230, 248/316.1, DIG. 4; 144/35 A, 1 F; 269/43, 45

[56] References Cited

U.S. PATENT DOCUMENTS

| | | | |
|---|---|---|---|
| 1,193,642 | 8/1916 | Wallace | 248/229 |
| 1,510,805 | 10/1924 | Smith | 248/229 X |
| 2,310,276 | 2/1943 | Bilz | 248/DIG. 4 X |
| 2,456,505 | 12/1948 | Hastings | 248/DIG. 4 X |
| 2,733,035 | 1/1956 | Rocheleau | 248/DIG. 4 X |
| 2,769,895 | 11/1956 | Boord | 248/229 |
| 3,385,545 | 5/1968 | Patton | 248/316.1 X |
| 4,211,380 | 7/1980 | Lillegard et al. | 248/229 |
| 4,736,921 | 4/1988 | Zane et al. | 248/229 X |

FOREIGN PATENT DOCUMENTS 1473881  2/1970  Fed. Rep. of Germany ... 248/316.1
  21051  of 1906  United Kingdom ............... 248/230

Primary Examiner—Ramon S. Britts
Assistant Examiner—Karen J. Chotkowski
Attorney, Agent, or Firm—John W. Carpenter

[57] ABSTRACT

A router bracket having a pair of cylindrical rings. A bridge member interconnects one cylindrical ring with another cylindrical ring. One of the cylindrical rings has a lug member bound thereto for engaging a depth gauge.

2 Claims, 2 Drawing Sheets

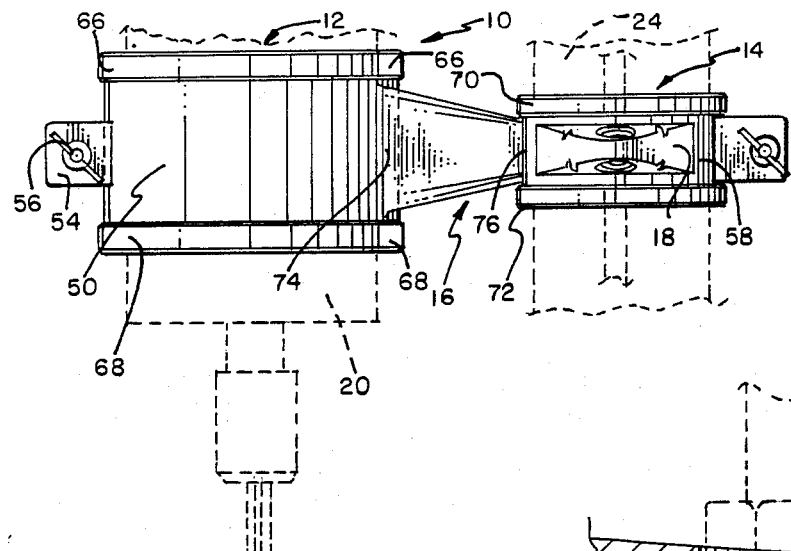
FIG. 5
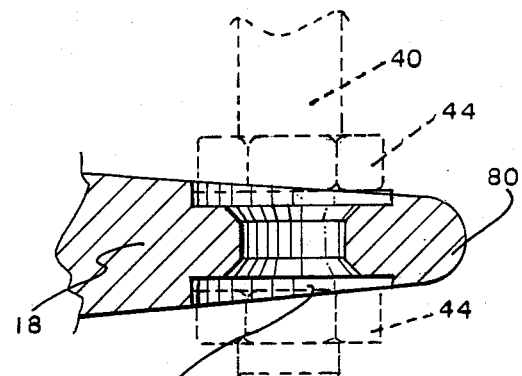
FIG. 6
FIG. 7
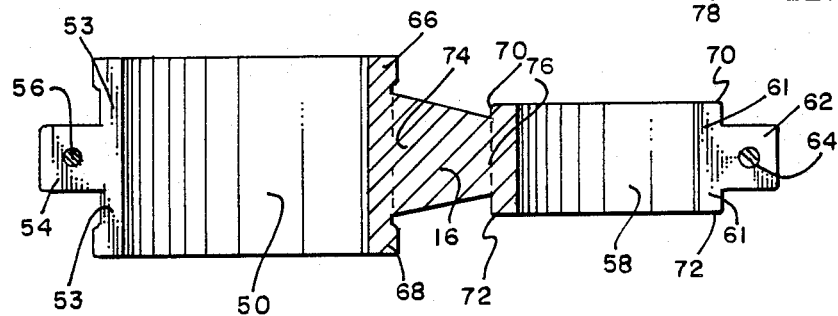
FIG. 8
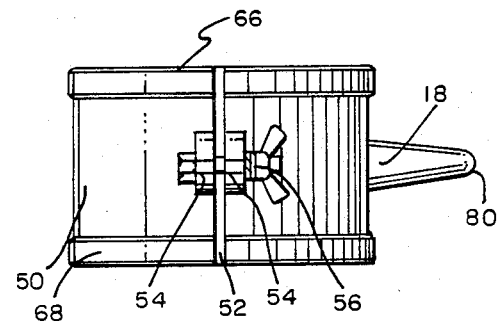
FIG. 9
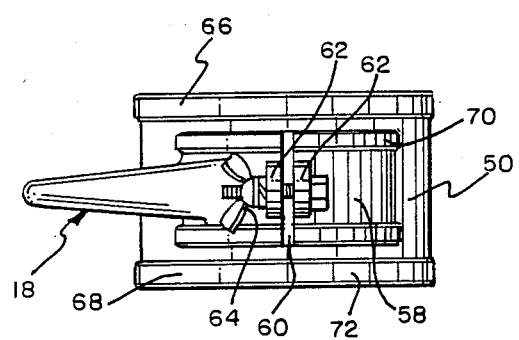

ROUTER BRACKET

SUMMARY OF THE INVENTION

The present invention accomplishes its desired objects by providing a router bracket having a pair of cylindrical ring means. Each ring means terminates into a pair of flanges spaced with respect to each other. A bridge member means is connected to each of the two cylindrical ring means. A lug means is bound to one of the cylindrical ring means for engaging a depth gauge means thereto. The lug means has a structure defining a lug aperture for receiving therethrough a depth gauge means. Each of the flanges has an aperture for receiving therethrough a nut-bolt assembly in order to tighten the rings and decrease the diameter of the same. The lug means and the bridge member means both have a structure that tapers. Both of the cylindrical ring means have an upper flanged perimeter and a lower flanged perimeter. A standard router is slidably disposed in one of the cylindrical ring means and a drill press is slidably disposed in the other cylindrical ring means.

The depth gauge of this invention comprises a standard secured to the drill press. The standard has a depth indicia. A platform is secured to the standard, and the platform has a slot wherethrough a gauge spacedly passes. The gauge has distance indicia and is removably disposed within the lug aperture of the lug means. At least one nut means threadably engages the top of the gauge above the slot.

Therefore, it is an object of the present invention to provide a router bracket for positioning and attaching a standard router to a drill press.

This object, together with the various ancillary objects and features which will become apparent to those skilled in the art as the following description proceeds, are attained by this novel router bracket, a preferred embodiment being shown with reference to the accompanying drawings, by way of example only, wherein:

BRIEF DESCRIPTION OF THE DRAWING

FIG. 5 is a side elevational view of the router bracket with the standard router and the drill press being illustrated as dotted lines;

FIG. 6 is an enlarged partial vertical sectional view of the lug means with its lug aperture having a pair of opposed recesses for countersinking therein a pair of nuts in an opposed relationship such that the depth gauge can be stationarily affixed within the lug aperture;

FIG. 7 is a vertical sectional view taken in direction of the arrows and along the plane of line 7—7 in FIG. 2;

FIG. 8 is an end elevational view of the router bracket; and

FIG. 9 is an end elevational view of another end of the router bracket.

DETAILED DESCRIPTION OF THE INVENTION

Figure 1:
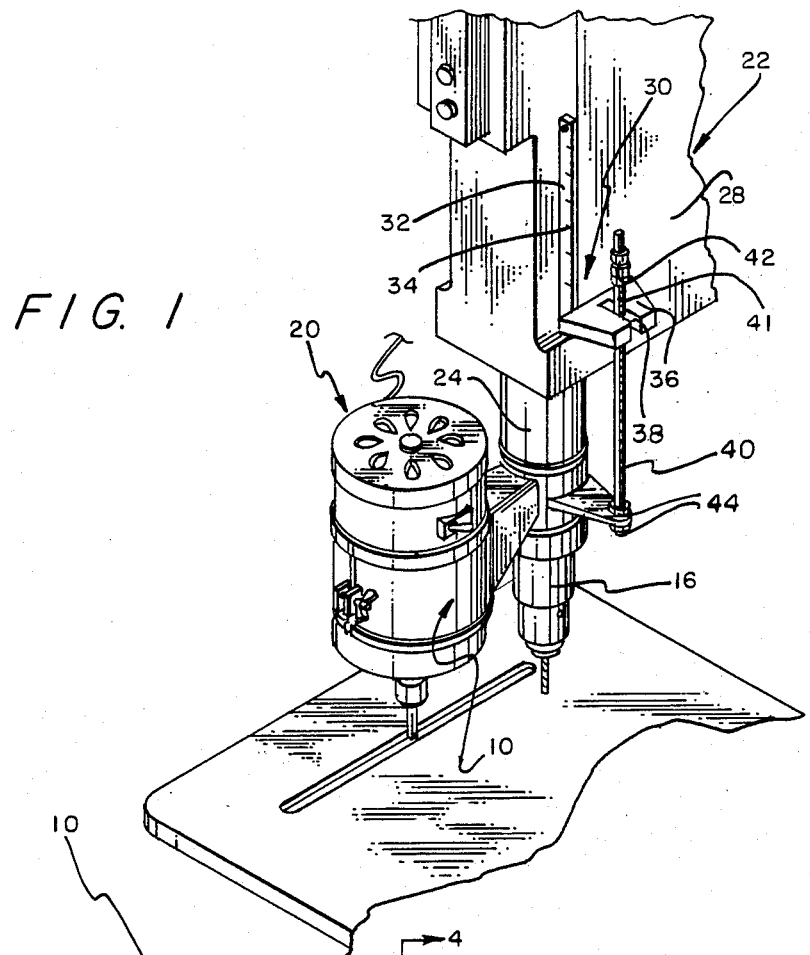
FIG. 1 is a perspective view of the router bracket of this invention positioned around a standard router and a drill press.

Referring in detail now to the drawings for a detailed description of the invention wherein similar parts of the invention are identified by like reference numerals, there is seen a router bracket, generally illustrated as 10, comprising a first cylindrical ring, generally illustrated as 12, a second cylindrical ring, generally illustrated as 14, and a bridge member, generally illustrated as 16, for interconnecting or bridging together the two rings 12 and 14. A lug means 18 is connected to the ring 14. The router bracket 10 of this invention provides for positioning and attaching a standard router, generally illustrated as 20, to a drill press means, generally illustrated as 22.

The standard router 20 may be any of the various tools or machines for routing, hollowing out, or furrowing, or tools or machines for routing out parts of an etched plate or die; all well known in the art. The drill press 22 is also well known in art having a drill press shank 24 terminating in a drill press chuck 26. The drill press chuck 26 is shown for reference only, and is to be removed when using the router 20. To convert the assembly back to solely a drill press 22, the standard router 20 is removed and the drill press chuck 26 is reinstalled. The router bracket 10 is left in place. Secured to a side 28 of the drill press 22 is a depth gauge means, generally illustrated as 30, which may be expediently adjusted to set precisely the depth of a router cut.

The depth gauge means 30 of this invention comprises an upright standard 32 attached to the side 28 of the drill press 22 and has depth indicia 34 marked thereon equidistantly. Attached to standard 32 is a gauge platform 36 having a structure defining a slot 38. Spacedly passing through slot 38 is gauge 40 having distance indicia 41 which can be aligned with indicia 34. The lower end of gauge 40 passes through a lug aperture (to be identified below) and is sandwiched stationarily therein by nuts 44-44 as shown in FIG. 1. The top portion of gauge 40 above the slot 38 contains threadably engaged therewith a plurality of nuts 42 which are used to align the router 20 at a more accurate depth with distance indicia 41 while simultaneously preventing the router 20 from operating at too great a depth due to abutment of the underside of the lower nut 42 with the top surface of the platform 36 since typically nuts 42 would have a greater width than the width of slot 38. It should be understood that one of the manners of setting the depth of the router 20 would be to set the lower nut 42 at the desired distance indicia 41, lock the lower nut 42 in place with the upper nuts 42, and subsequently lower the router bracket 20 (including the attached gauge 40) until the underside of the lower nut 42 would indeed by flushed with and about the top surface of the platform 36.

The first cylindrical ring 12 comprises a cylindrical structure 50 which terminates in or defines a slot 52 having side boundaries partly formed by cylindrical wall ends 53-53 and a pair of flanges 54-54 which extend outwardly from the cylindrical structure 50. Each of the flanges 54 is formed with a flange aperture (not shown) wherethrough a bolt-nut assembly 56 passes. The cylindrical structure 50 has a diameter which is suitable to surround the router 20. The flanges 54 are spaced apart and may be brought together by tightening the nut of the bolt-nut assembly 56 such as to decrease the diameter of the cylindrical structure 50 to rigidly secure the router 20 within the cylindrical structure 50.

The second cylindrical ring 14 comprises a structure similar to ring 12. More specifically, ring 14 comprises cylindrical structure 58 which terminates in or defines a slot 60 having side boundaries partly formed by cylindrical wall ends 61—61 by a pair of flanges 62—62 which extend outwardly from the cylindrical structure 58. Each of the flanges 62 is formed with a flange aperture (not shown) wherethrough a bolt-nut assembly 64 passes. The cylindrical structure 58 has a diameter which is suitable to surround the drill shank 24. The flanges 62 are spaced apart and may be brought together by tightening the nut of the bolt-nut assembly 64 such as to decrease the diameter of the cylindrical structure 58 to rigidly secure the drill shank 24 within the cylindrical structure 58. As is obvious from the drawings, the diameter of the cylindrical structure 5 is smaller, or less than the diameter of the cylindrical structure 50. Furthermore, the length or height of the cylindrical structure 50 is longer or greater than the length or height of the cylindrical structure 58.

Both of the cylindrical structures 50 and 58 are hollow. The top and bottom of the cylindrical structure 50 respectively have upper circular flanged perimeter 66 and lower circular flanged perimeter 68. Similarly, the top and bottom of the cylindrical structure 58 respectively has upper circular flanged perimeter 70 and lower circular flanged perimeter 72. All of the flanged perimeters 66, 68 and 70, 72 respectively extend away from the cylindrical structures 50 and 58.

Figure 2:
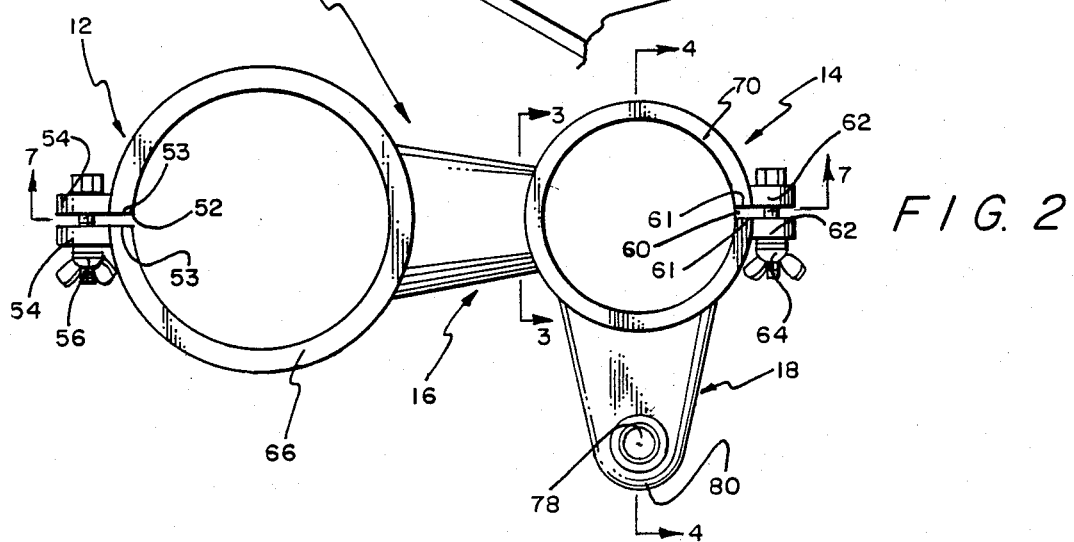
FIG. 2 is a top plan view of the router bracket.
Figure 3:
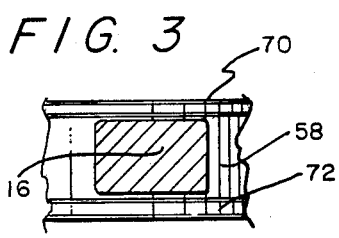
FIG. 3 is a vertical sectional view taken in direction of the arrows and along the plane of line 3—3 in FIG. 2.

Interconnecting or bridging together the rings 12 and 14 is bridge member 16 which connects to the cylindrical structure 50 between upper and lower flanged perimeters 66 and 68 and connects to the cylindrical structure 58 between upper and lower flanged perimeters 70 and 72 as best illustrated in FIGS. 5 and 7. As further best illustrated in FIGS. 5 and 7, the bridge member 16 tapers from the cylindrical structure 50 towards the cylindrical structure 58 such that the bridge member 16 has a thickness greater at point 74, at the point where the structure 50 bonds to bridge member 16, than at point 76 where bridge member 16 is bound to structure 58. As best shown in FIG. 2, flanges 54—54 and flanges 62—62 are diametrically opposed to the bridge member 16.

Figure 4:
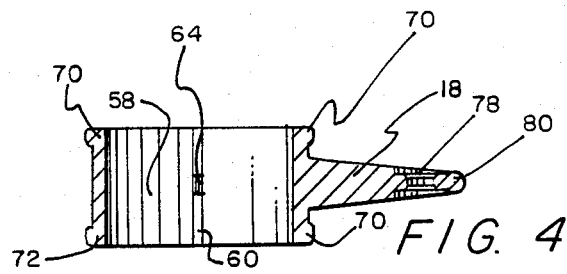
FIG. 4 is a vertical sectional view taken in direction of the arrows and along the plane of line 4—4 in FIG. 2.

The lug means 18 has an aperture 78 (see FIG. 2) for receiving therein the gauge 40, as was previously indicated. Aperture 78 is in close proximity to an extreme end 80 of the lug means 18 which may be defined as the extreme or farthest point from cylindrical structure 58. As illustrated in FIGS. 4 and 9, lug means 18 tapers outwardly towards end 80 and away from the cylindrical structure 58. The lug means 18 is connected to the cylindrical structure 58 between the upper and lower flanged perimeters 70 and 72.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A router bracket comprising a first cylindrical ring means having a first cylindrical structure terminating in a pair of first flanges spaced with respect to each other; a bridge member means bound to said first cylindrical ring; a second cylindrical ring means having a second cylindrical structure terminating in a pair of second flanges spaced with respect to each other; and a lug means gauge means; said lug means has a structure defining a lug aperture for receiving therethrough a depth gauge means; said first cylindrical ring means has a first diameter, and each of said first flanges has a first flange aperture; and a nut-bolt means passing through said first flange aperture of each of said first flanges for compressing together the first cylindrical structure to decrease the first diameter; second cylindrical ring means has a second diameter, and each of said second flanges has second flange aperture; and a second bolt means passing through said second flange aperture of each of said second flanges for compressing together of each of said second flanges for compressing together the second cylindrical structure to decrease the second diameter; said first flanges and said second flanges are generally diametrically opposed to said bridge member means; said bridge member means has a bridge structure tapering from the first cylindrical ring means towards said second cylindrical ring means such that the bridge member has a thickness greater at the point where the first cylindrical ring means bounds to the bridge member means than at the point where the second cylindrical ring means bounds to the bridge member means; said first cylindrical ring means has a first length and said second cylindrical ring means has a second length, and said first cylindrical ring means has a second length, and said first length is greater than said second length; said first diameter is greater than said second diameter; said lug means tapers outwardly such that the lug means has a thickness greater at the point of bounding with the second cylindrical means than at an extremity point not secured to any structure; said lug aperture is in close proximity to said extremity point not secured to any structure; said first cylindrical structure is hollow with a first upper general circular flanged perimeter and with a first lower general circular flanged perimeter, said first upper flanged perimeter and said first lower flanged perimeter respectively extend away from the first cylindrical structure; said second cylindrical structure is hollow with a second upper general circular flanged perimeter and with a second lower flanged perimeter, said second upper flanged perimeter and said second lower flanged perimeter respectively extend away from the second cylindrical structure; said bridge member means is connected to said first cylindrical structure between said first upper flanged perimeter and said first lower flanged perimeter and is connected to said second cylindrical structure between said second upper flanged connector and said second lower flanged perimeter; and additionally comprising a depth gauge means engaged within said lug aperture.

2. The router bracket of claim 1 wherein said depth gauge means comprises a standard to be secured to a drill press, said standard having depth indicia; a platform secured to said standard, said platform having a slot; a gauge secured within said lug aperture A spacedly passing through said slot, said gauge having distance indicia; and at least one nut means threadably engaged to the top of said gauge above said slot.

* * * * *